United States Patent [19]
McKiel, Jr.

[11] Patent Number: 5,640,557
[45] Date of Patent: Jun. 17, 1997

[54] METHOD AND SYSTEM FOR PROCESSING LOGIC BLOCKS IN A DATA PROCESSING SYSTEM

[75] Inventor: Frank Albert McKiel, Jr., Trophy Club, Tex.

[73] Assignee: International Business Machines Corporation, Armonk, N.Y.

[21] Appl. No.: 342,072

[22] Filed: Nov. 18, 1994

[51] Int. Cl.⁶ .................................................. G06F 17/30
[52] U.S. Cl. .................................. 395/611; 345/726
[58] Field of Search ............................. 395/600, 650, 395/375, 611, 726; 364/578; 379/223

[56] References Cited

U.S. PATENT DOCUMENTS

| | | | |
|---|---|---|---|
| 3,894,191 | 7/1975 | Sassa | 179/18 |
| 4,649,470 | 3/1987 | Bernstein et al. | 395/600 |
| 4,718,094 | 1/1988 | Bahl et al. | 381/43 |
| 5,051,886 | 9/1991 | Kawaguchi et al. | 395/600 |
| 5,278,981 | 1/1994 | Kawaguchi et al. | 395/600 |
| 5,283,896 | 2/1994 | Temmyo et al. | 395/650 |
| 5,301,100 | 4/1994 | Wagner | 364/148 |
| 5,389,838 | 2/1995 | Orengo | 326/93 |
| 5,463,543 | 10/1995 | Wagner et al. | 364/141 |
| 5,473,531 | 12/1995 | Flora-Holmquist | 364/148 |

OTHER PUBLICATIONS

Langevin et al., "An Automata-Theoretic Approach tp LocalMicrocode Generation", Proceedings of the European Conference onDesign Automation with the European Event in ASIC Design, 22–25Feb. 1993, Paris France, pp. 94–98.
Shieh et al., "Model of Asynchronous Finite State Machines andTheir Pipelined Structures", Proceedings of the 35th MidwestSymposium on Circuits and Systems, 9–12 Aug. 1992, WashintonD.C., pp. 659–662.
Wu et al., "Modelling Robust Asynchronous Communication Protocolswith Finite-State Machines", IEEE Transactions on Communications, vol. 41, No. 3, Mar. 1993, pp. 492–500.
Tam-Anh Chu, "On the Specification and Synthesis of Hazard-freeAsynchronous Control Circuits", Circuits and Systems, 1993 IEEEInternational Symposium, 5 May 1993, pp. 1495–1498.
Robert Sedgewick, Algorithms, Addison Wesley Publishing Comany,Inc. (Reading Ma, 1983), pp. 244–268.
McEliece et al., Introduction to Discrete Mathematics, RandomHouse (New York Ny, 1989), pp. 191–281.

Primary Examiner—Thomas G. Black
Assistant Examiner—Paul R. Lintz
Attorney, Agent, or Firm—Edward H. Duffield; Andrew J. Dillon

[57] ABSTRACT

A method and apparatus for evaluating a plurality of logical elements connected to each other by a plurality of connectors, wherein a change of state may occur in at least one of the plurality of logical elements. A state data field is established for each of the plurality of connectors. State data is used within each connection to compare and asserted output of one node with the acknowledged input of another node. Logical elements that require reevaluation are identified from the plurality of elements. By searching for discrepancies within the state data field(s).

4 Claims, 7 Drawing Sheets

600

| CONNECTOR | SN | DN | STATE |
|-----------|-----|-----|-------|
| 1 | $SN_1$ | $DN_1$ | $ST_1$ |
| 2 | $SN_2$ | $DN_2$ | $ST_2$ |
| 3 | $SN_3$ | $DN_3$ | $ST_3$ |
| ⋮ | ⋮ | ⋮ | ⋮ |

| NODE | POINTER | STATE |
|------|---------|-------|
| N1 | P1 | S1 |
| N2 | P2 | S2 |
| N3 | P3 | S3 |
| ⋮ | ⋮ | ⋮ |

*Fig. 6B*

METHOD AND SYSTEM FOR PROCESSING LOGIC BLOCKS IN A DATA PROCESSING SYSTEM

BACKGROUND OF THE INVENTION

1. Technical Field

The present invention relates generally to an improved data processing system and more particularly, to an improved method and system for data manipulation. Still more particularly, the present invention provides an improved method and system for processing interconnectable elements called nodes and logical connections between the elements.

2. Description of the Related Art

The manipulation of data in a data processing system is well known in the prior art. Data may be manipulated in many ways in a modern state of the art data processing system, including: data accessing, data encoding, data exchange, data filing, data linking, data locking, data mapping, data modeling, data recording, data sorting, and data transferring. The large amount of data that are available to the user of a modern state-of-the-art data processing system often becomes overwhelming in magnitude and complexity.

A graphic user interface "GUI" is often employed to manage and manipulate data. Often times the manipulation of data involves logical manipulations in a GUI; the manipulation of data may be accomplished via graphical objects having logical relationships between them to form a logic expression. For example, a logical editor is a type of graphical object editor that is typically employed in a GUI to create or compose logical expressions with graphic objects. Iconic representation of logical elements or blocks, also referred to as "nodes", may be placed on a work space within the logical editor by the user and connected to each other by manipulating a mouse or using keyboard input so that a desired logical function can be expressed by the user and performed by the data processing system.

Typically, nodes are connected in an event/condition/action form. An event may be, for example, the reception of mail or a telephone call. For example, in FIG. 1A, event node 100 becomes active when mail arrives. Event node 100 is connected to condition node 102 by connector 104. Condition node 102 is active if event node becomes active within a selected period of time. In turn, condition node 102 is connected to action node 106 by connector 108. Action node 106 places the mail in a folder if the mail arrives within the selected period of time set by condition node 102. Such an arrangement works well unless a user does not conform to the event/condition/action format. For example, in FIG. 1B, the positions of event node 100 and condition node 102 have been switched. This selection of nodes by a user would not be properly evaluated under a system employing an event/condition/action format. Thus, a user is constrained by the way a system evaluates nodes. Deviation from this format can result in the system being unable to properly evaluate the nodes because event node 100 is designated as the trigger for the system.

Therefore, it would be advantageous to have a method and system for evaluating nodes within a logical editor in which a user is not constrained by a particular format for placing nodes.

SUMMARY OF THE INVENTION

It is one object of the present invention to provide an improved data processing system.

It is another object of the present invention to provide an improved method and system for data manipulation.

It is yet another object of the present invention for providing an improved method and system for processing logical nodes and logical connections between the nodes.

The present invention provides a method and apparatus for evaluating a plurality of logical elements connected to each other by a plurality of connectors, wherein a change of state may occur in at least one of the plurality of logical elements. A state data field is established for each of the plurality of connectors. State data is used within each connection to compare and asserted output of one node with the acknowledged input of another node.

Logical elements that require reevaluation are identified from the plurality of elements. By searching for discrepancies within the state data field(s).

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a connection list in accordance with a preferred embodiment of the present invention;

FIG. 6B is a node list in accordance with a preferred embodiment of the present invention;

DETAILED DESCRIPTION OF PREFERRED EMBODIMENT

Figure 2:
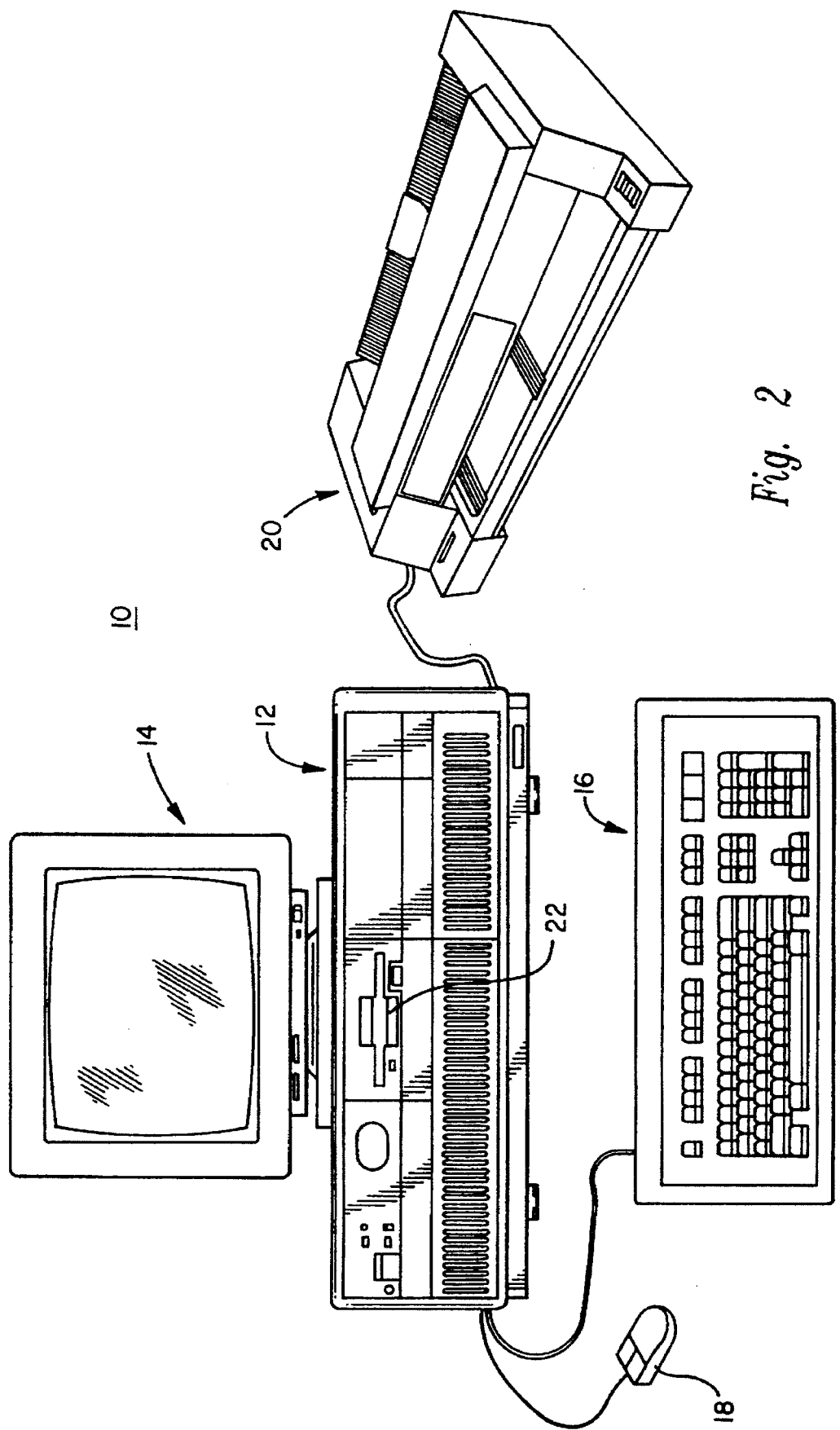
FIG. 2 is an illustration of a data processing system in the form of a personal computer in which the present invention can be employed.

Referring now to the figures, and in particular to FIG. 2, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 3:
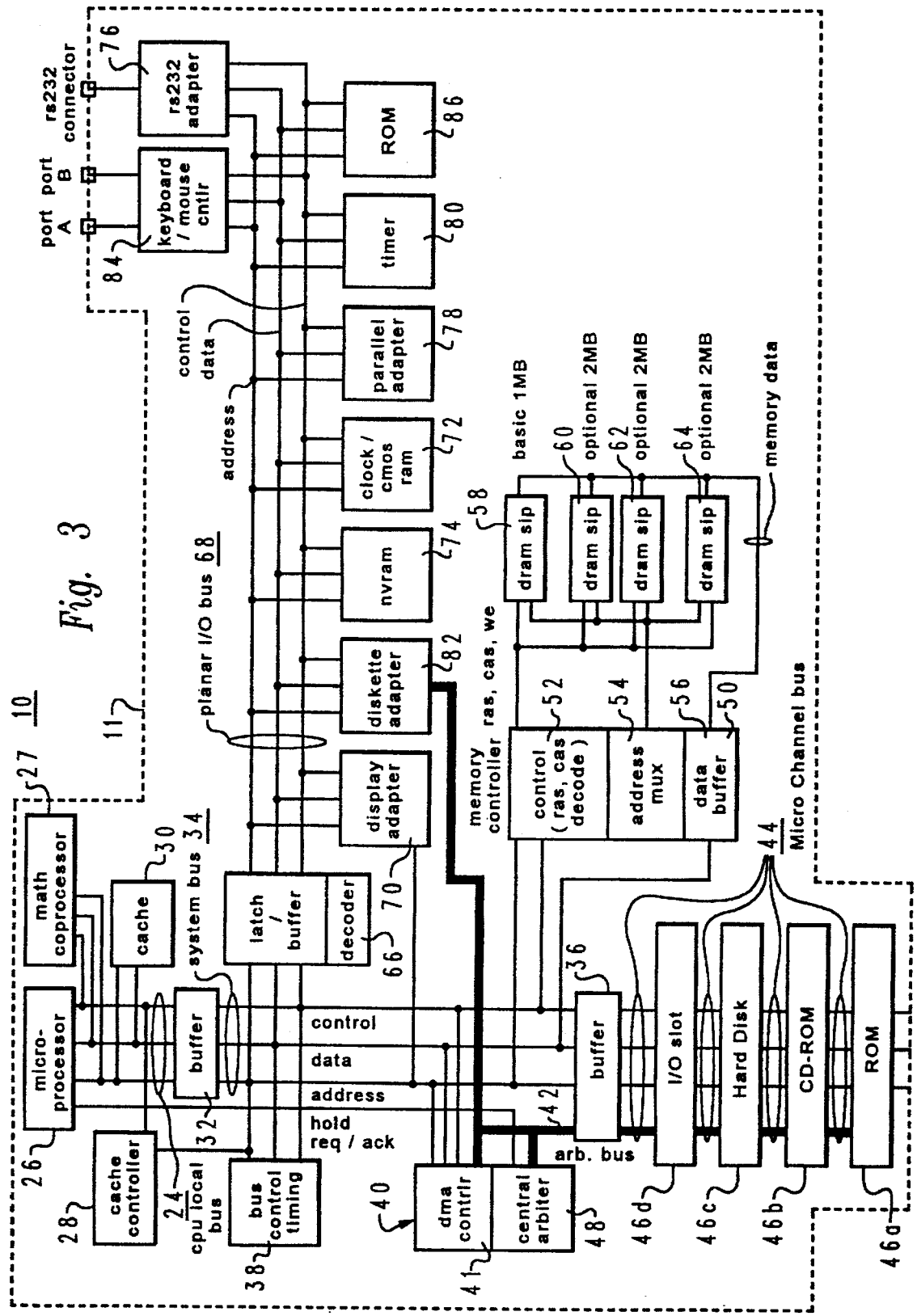
FIG. 3 is a block diagram of a personal computer system illustrating the various components of the personal computer system in FIG. 1 in accordance with a preferred embodiment of the present invention.

Prior to relating the above structure to the present invention, a summary of the operation in general of personal computer system 10 may merit review. Referring to FIG. 3, there is shown a block diagram of personal computer system 10 illustrating the various components of personal computer system 10 in accordance with the present invention. FIG. 3 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 3, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 3, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 3 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 1A:
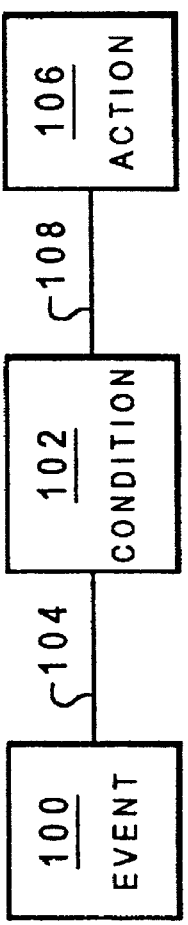
FIGS. 1A and 1B illustrate a connection of nodes known in the prior art.
Figure 1B:
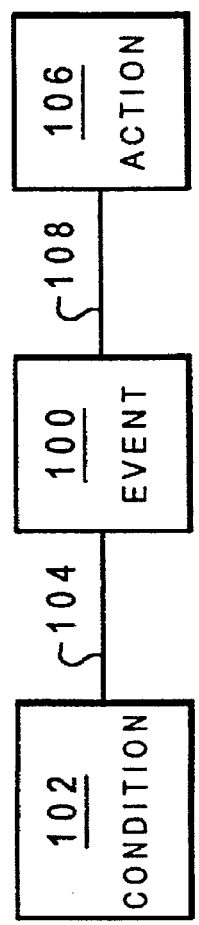
Figure 4:
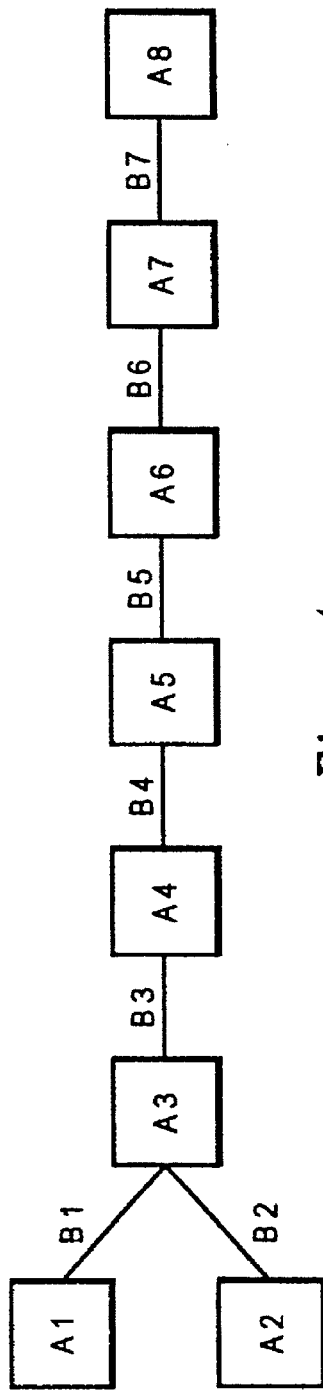
FIG. 4 is an illustration of nodes and connectors depicted in accordance with a preferred embodiment of the present invention.

Referring next to FIG. 4, an illustration of nodes and connectors is depicted in accordance with the preferred embodiment of the present invention. As can be seen, nodes A1–A8 are connected to each other by connectors B1–B7 on work surface 400 in a logical editor executing on a data processing system. According to the present invention, the evaluation of these interconnected nodes may be improved by implementing a communications and acknowledgment scheme, which assures that state changes are recognized and propagated regardless of the connection scheme implemented. The present invention employs an internal representation of a connection between two elements using a pair of values. For example, a high byte and a low byte within a sixteen bit integer may be employed according to the present invention.

Figure 5:
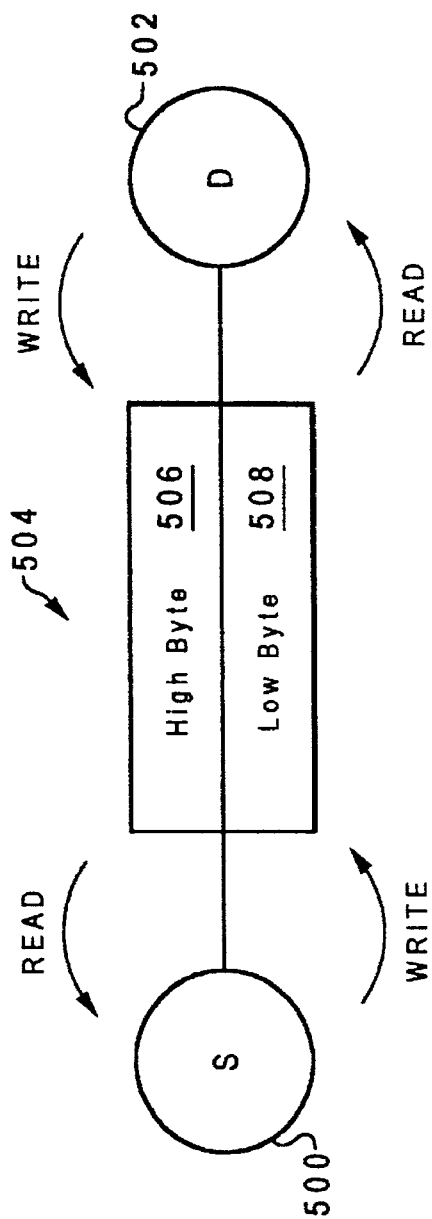
FIG. 5 depicts a diagram of a source node connected to a destination node by a connector according to the present invention.

Turning to FIG. 5, a diagram of a source node connected to a destination node by connector is illustrated according to the present invention. Source node 500 is connected to destination node 502 by connector 504. As can be seen, connector 504 includes a high byte 506 and a low byte 508. Source node 500 may read high byte 506 and has the ability to write only the low byte 508 to express its output state. Destination node 502 has the ability to read the low byte and can acknowledge the receipt of the current data by copying low byte 508 into high byte 506. Source node 500 may read high byte 506 to test if the output state from source node 500 has been recognized by destination node 502. In addition, a main program, also called a "logic engine" may examine a high byte and a low byte by scanning a data structure containing a list of connections to determine whether any connections are unresolved high byte not equal to low byte.

Referring next to FIG. 6A, connection list 600 includes entries for a connector, a source node, a destination node, and a state. In the depicted example, the state is the 16 bit integer representing the high byte and the low byte in a connector. Unresolved connections may be found by comparing the high byte to the low byte. If unresolved connections are present, the logic engine may trigger or initiate certain nodes to reevaluate their logic states.

The logic engine also may perform a similar scan of internal states of nodes. For example, a logic engine may scan node list 602 in FIG. 6B to determine whether any nodes contain unresolved internal states. As can be seen in FIG. 6B, node list 602 includes entries for the node, a pointer to the connector in the connection list, and a state. The state in node list 602 is the internal state of the node. This state also may be represented by a 16 bit integer having a high byte and a low byte in accordance with a preferred embodiment of the present invention. The values used in the high bytes and low bytes for the states in the connection list and the node list may be random, or may depend on the resolution of the node in response to an external connection in the case of a state in the connection list. With respect to a state in the node list, the values employed also may be random or depend on the resolution of the node in response to its external connection. For example, a node may have an external connection to a telephone line. A value may be written into the high byte in response to a call ringing the telephone line. In such a case, the high byte would no longer match the low byte and a examination of the state by a logic engine would result in an indication that an unresolved condition existed in the node connected to the telephone line. An unresolved condition signifies an unrecognized logic state. The present invention is particularly useful for allowing state changes to propagate.

Figure 7:
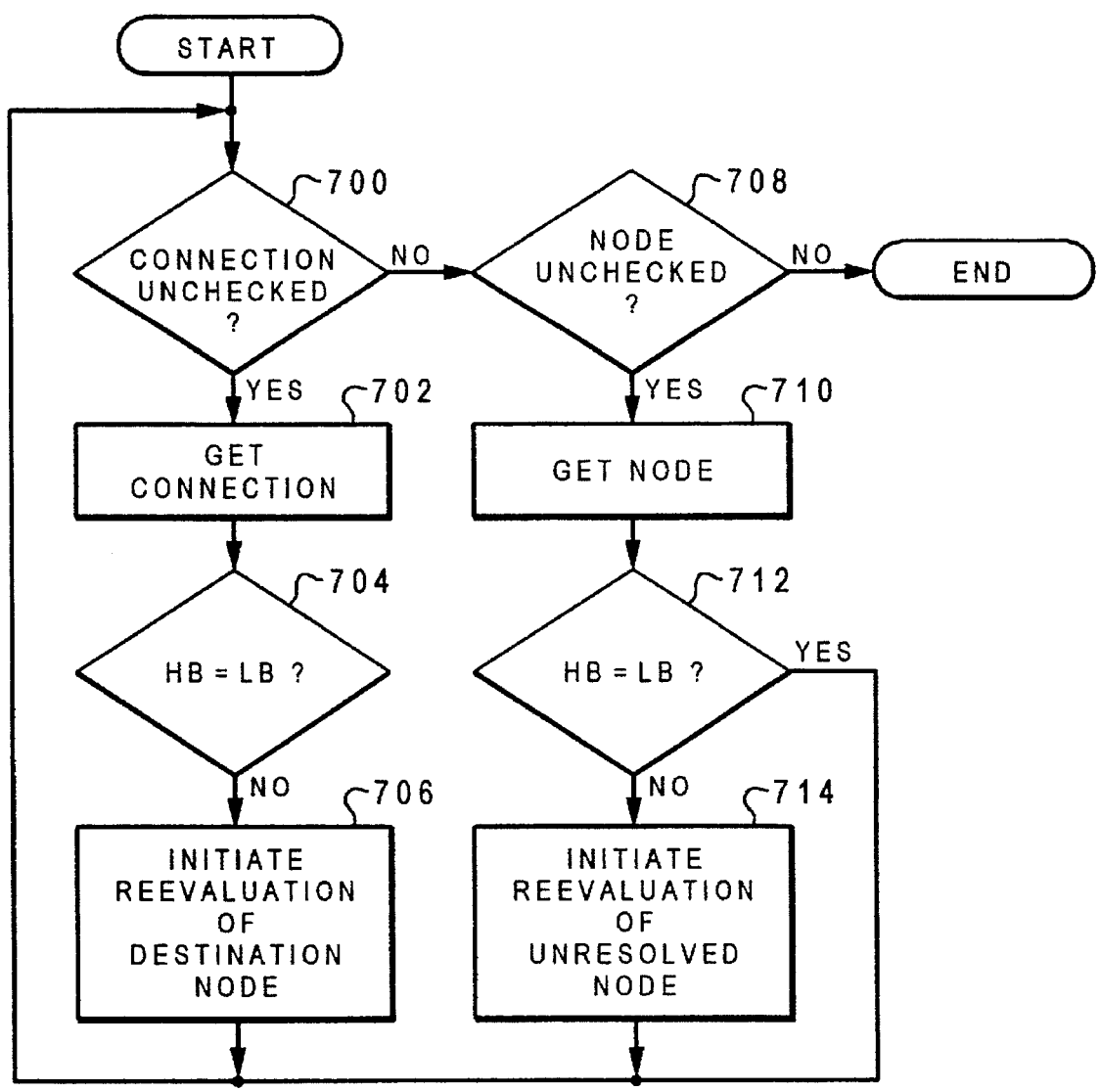
FIG. 7 depicts a flow chart of a process for evaluating nodes and connections in accordance with a preferred embodiment of the present invention.

Referring now to FIG. 7, a flow chart of a process for evaluating nodes and connections in accordance with a preferred embodiment of the present invention is depicted. The process illustrated in FIG. 7 may be initiated upon an input from a user or may be continuously run to recheck the state of nodes and connectors constantly. The process begins by determining whether unchecked connections exist, as illustrated in block 700. If connections that have not been checked exist, the process then obtains the next connection, as depicted in block 102. A determination is then made as to whether the high byte equals the low byte in the state value in the connection list, as illustrated in block 104. If the high byte does not equal the low byte, the process initiates a reevaluation of the destination node attached to the connector having an unresolved state, as depicted in block 706. The process then returns to block 700. Referring again to block 704, if the high byte does equal the low byte, the process also returns to block 700.

When no unchecked connections exist in block 700, the process then determines whether unchecked nodes exist, as illustrated in block 708. A presence of unchecked nodes results in the process obtaining the next unchecked node as depicted in block 710. Thereafter, the process determines whether the high byte equals the low byte for the state associated with the unchecked node, as illustrated in block 712. If the high byte does not equal the low byte, the process then initiates a reevaluation of the unresolved node, as depicted in block 714. The process then returns to block 700. Referring again to block 712, if the high byte equals the low byte, the process also returns to block 708. When no more unchecked nodes are present, the evaluation process then terminates.

Figure 8:
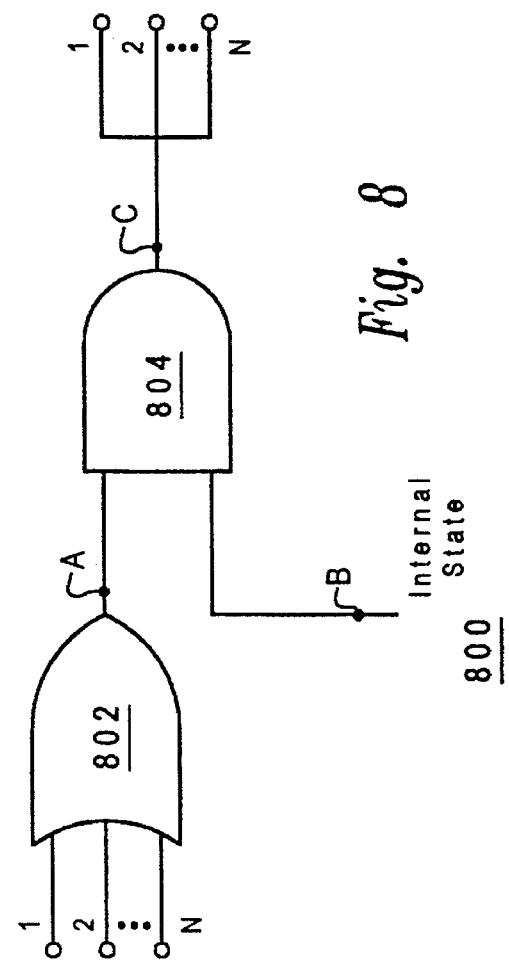
FIG. 8, depicts a logic diagram of a node in accordance with a preferred embodiment of the present invention.

With reference to FIG. 8, a logic diagram of a node is depicted in accordance with a preferred embodiment of the present invention. Node 800 includes 0 to N inputs into OR gate 802. The output of OR gate 802 is connected to AND gate 804. AND gate 804 has an additional input, the internal state of node 800. The output of AND gate 804 is connected to the output of node 800, which has 1–N output. Node 800 may have some lesser number of inputs and outputs, and in some circumstances may have no input or no outputs in accordance with a preferred embodiment of the present invention.

Node 800 evaluates point A, which is the output of OR gate 802. Point A is evaluated by taking the inputs 1–N and performing an OR function at OR gate 802. If no inputs are present, a constant logic 1 is input into OR gate 802, then point B is evaluated. This evaluation involves checking the internal state of the node, which may include an action, an event, or a condition. An "action" may be, i.e., priming a document, or sending a mail message. An "event" involves checking to see whether an initiating circumstance has occurred. An "condition" involves determining whether a condition is true. An evaluation of the internal state involves making a function call and expecting a return code in response to the function call. Point C is evaluated by performing an AND function from the evaluation of points A and D at AND gate 804.

Figure 9:
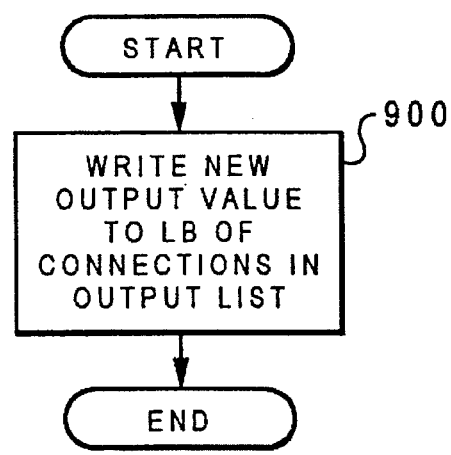
FIG. 9, depicts a flowchart of a process for sending outputs in accordance with a preferred embodiment of the present invention.

With reference now to FIG. 9, a flowchart of a process for sending outputs is depicted in accordance with a preferred embodiment of the present invention. The process writes the new process value to the low byte of connections in the output list for the node as depicted in block 900 with the process terminating thereafter.

Figure 10:
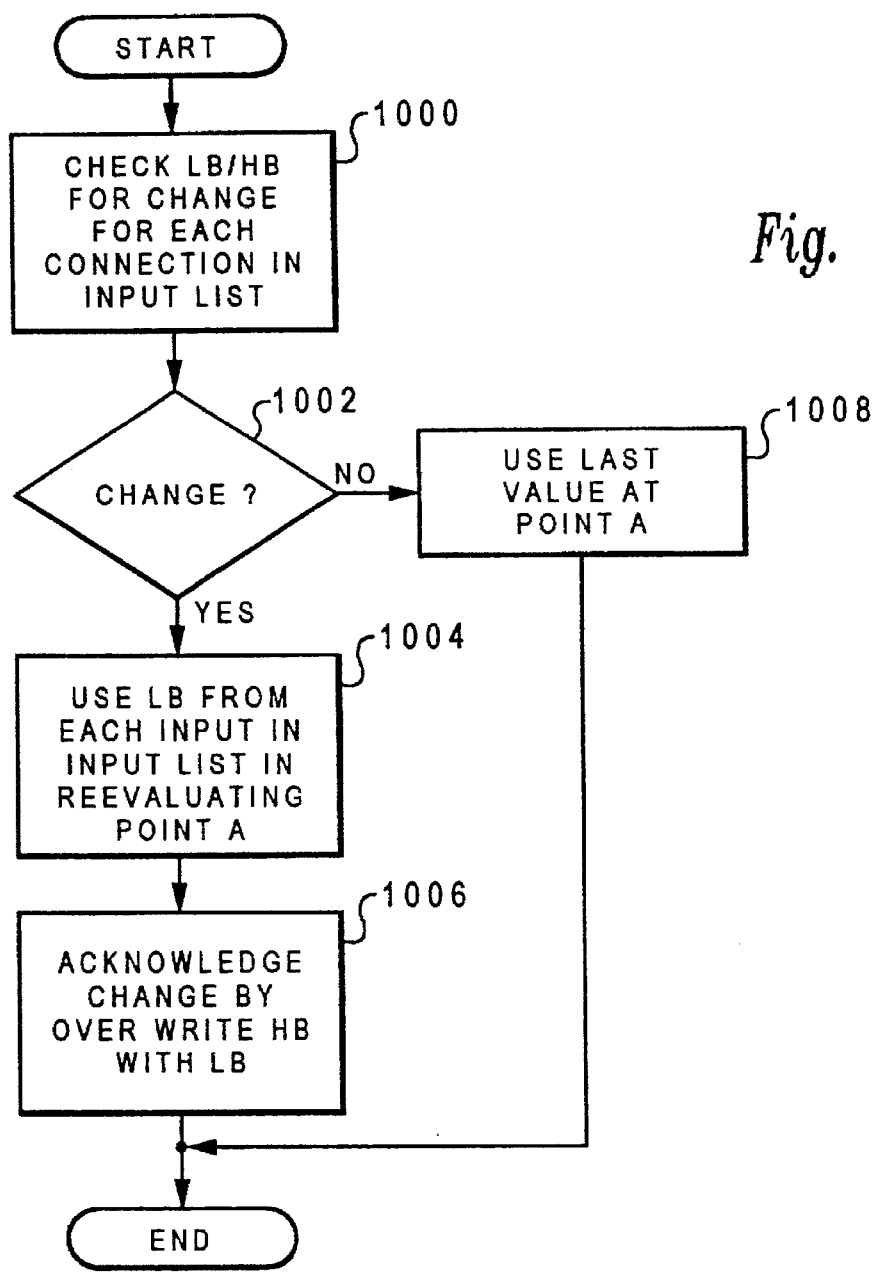
FIG. 10 depicts a flowchart for processing inputs at a node in accordance with a preferred embodiment of the present invention.

Referring next to FIG. 10, a flowchart for the processing of inputs at a node is depicted in accordance with a preferred embodiment of the present invention. The process begins by checking the low byte and the high byte for a change for each connection in the input list of the node as depicted in block 1000. Thereafter, a determination is made as to whether a change has occurred, as illustrated in block 1002. If a change has occurred, a process then uses the low byte from each input in the input list and reevaluating point A in FIG. 8, as illustrated in block 1004. Next, the process acknowledges the change by overwriting the high byte for the connection in the input list with the low byte as depicted in block 1006, with the process terminating thereafter. Referring again to block 1002, if a change has not occurred, the process uses the last value at point A from FIG. 8 as the input, as illustrated in block 1008.

Blocks 1002 and 1008 are optional and may be skipped if Boolean inputs are used as inputs to the node. If linear inputs are employed, these blocks may speed up the process.

While the invention has been particularly shown and described with reference to a preferred embodiment, it will be understood by those skilled in the art that various changes in form and detail may be made therein without departing from the spirit and scope of the invention.

I claim:

1. A method in a data processing system for evaluating a plurality of logical elements connected to each other by a plurality of connectors, each of said plurality of connectors beinq associated with a source logical element and a destination logical element, wherein a change of state may occur in at least one of said plurality of logical elements, said method comprising:

establishing a state data field associated with each of said plurality of connectors by storing a hiqh byte and a low byte for each of said plurality of connectors;

changing said state data field in response to a change of state in a logical element to reflect said change of state in said logical element by alterinq said high byte associated with a connector in response to a change in state which occurs in a source logical element and altering said low byte associated with a connector when a destination node associated with said connector acknowledges said change of state in said source logical element;

identifying logical elements from said plurality of logical elements that require evaluation by utilizing said state data field;

evaluating said identified logical elements in response to an identification of said identified logical elements.

2. The method of claim 1, wherein said step of identifying comprises identifying logical elements from said plurality of logical elements that require evaluation by comparing a high byte associated with a connector to a low byte associated with said connector.

3. A data processing system for evaluating a plurality logical elements connected to each other by a plurality of connectors each of said plurality of connectors being associated with a source logical element and a destination logical element, wherein a change of state may occur in at least one of said plurality of logical elements, said data processing system comprising:

establishment means for establishing a state data field associated with each of said plurality of connectors by storing a high byte and a low byte for each of said plurality of connectors;

alteration means for changing said state data field in response to a change of state in a logical element to reflect said change of state in said logical element by altering said high byte associated with a connector in response to a change in state which occurs in a source logical element and altering said low byte associated with a connector when a destination node associated with said connector acknowledges said change of state in said source logical element;

identification means for identifying logical elements from said plurality of logical elements that require evaluation by utilizing said state data field;

evaluation means for evaluating said identified logical elements in response to an identification of said identified logical elements.

4. The data processing system of claim 3, wherein identification means for identifying logical elements from said plurality of logical elements that require evaluation by comparing a high byte associated with a connector to a low byte associated with said connector.

* * * * *